United States Patent Office 3,494,449
Patented Feb. 10, 1970

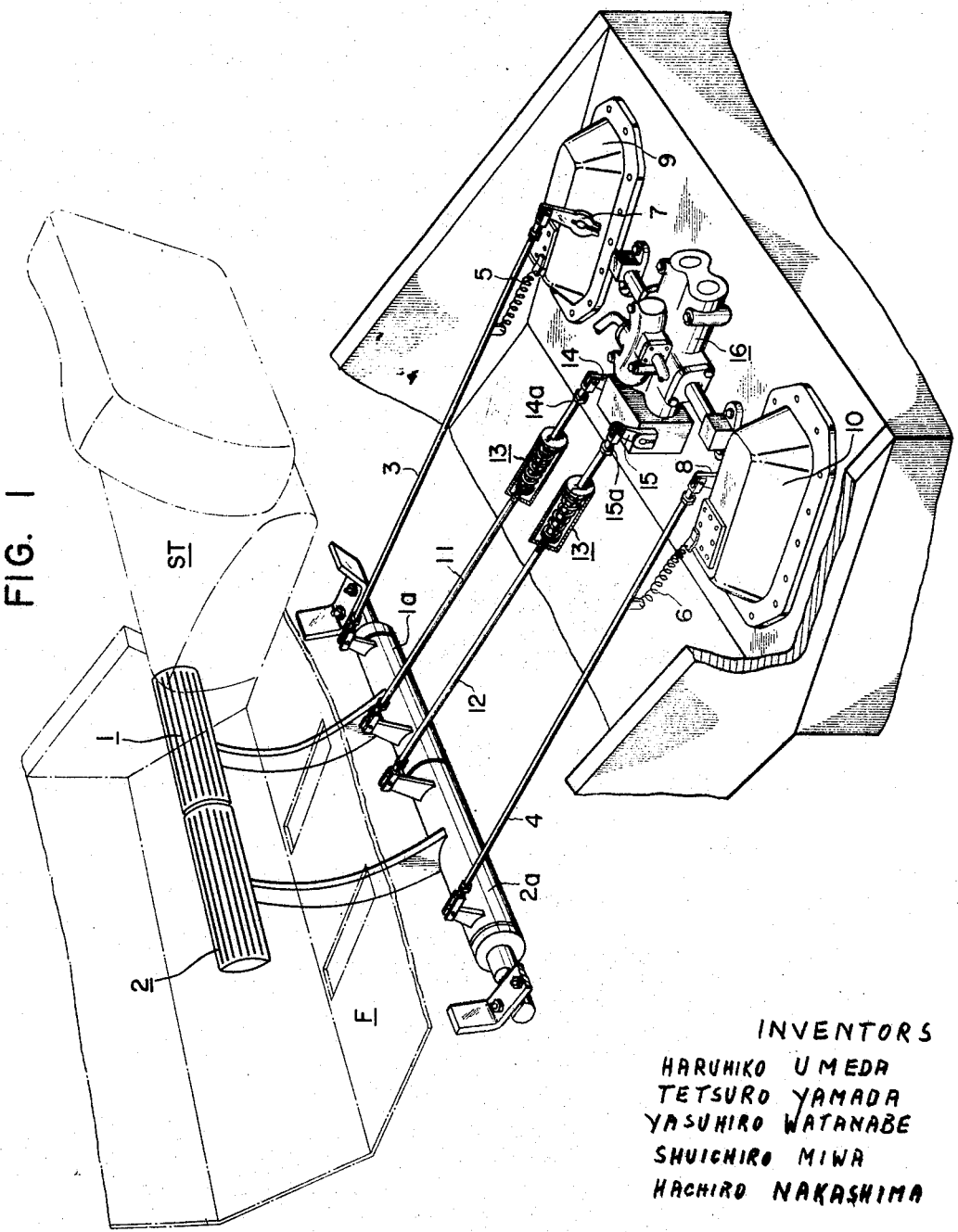

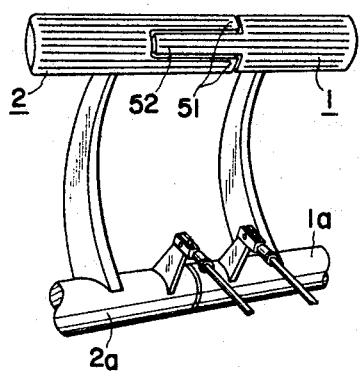
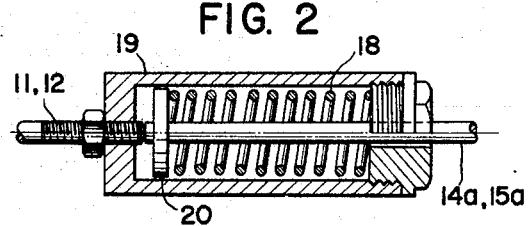
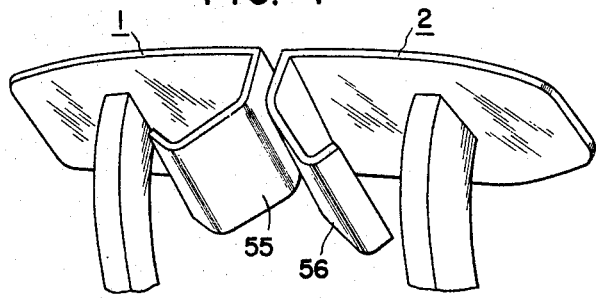
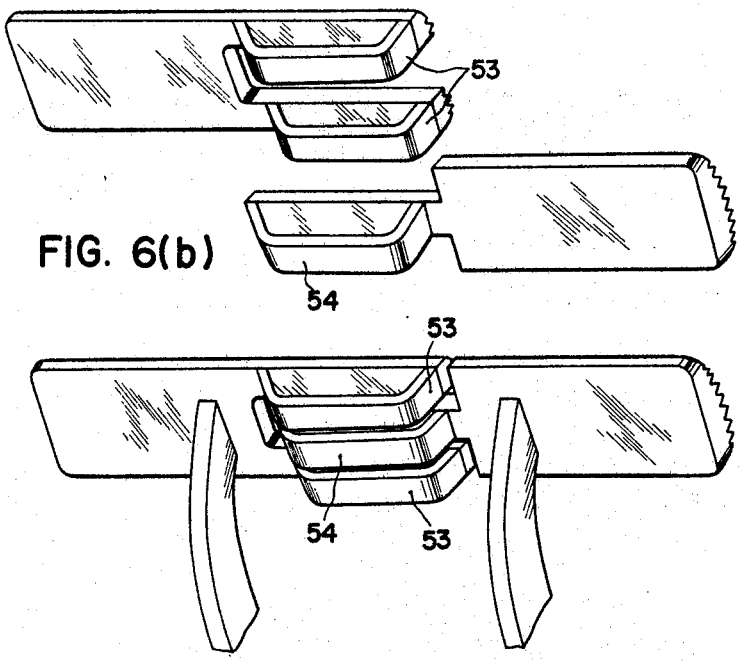

3,494,449
CONTROL SYSTEM IN VEHICLE HAVING STEERING CLUTCHES AND BRAKES
Haruhiko Umeda, and Tetsuro Yamada, Komatsu-shi, Yasuhiro Watanabe, Fukui-shi, and Shuichiro Miwa and Hachiro Nakashima, Komatsu-shi, Japan, assignors to Kabushiki Kaisha Komatsu Seisakusho, Tokyo-to, Japan, a joint-stock company of Japan
Filed Mar. 6, 1968, Ser. No. 727,386
Claims priority, application Japan, Mar. 29, 1967, 42/19,214
Int. Cl. F16d 62/04
U.S. Cl. 192—13                                11 Claims

ABSTRACT OF THE DISCLOSURE

A hydraulic control valve having two valve spools connected through respective linkages to left and right pedals is thereby actuated to switch hydraulic pressure to steering clutches of a vehicle and thereby to operate either or both of the clutches, left and right brakes being applied by over-stroke depression of the pedals, whereby braking action is always produced with the left and right clutches in engaged state when the pedals are depressed for braking, irrespective of whether the vehicle is turning or whether it is moving in a straight path.

BACKGROUND OF THE INVENTION

This invention relates to the field of vehicles having steering clutches and brakes. More particularly, the invention concerns a new and improved control system whereby steering (turning) and braking of a vehicle referred to above can be safely accomplished entirely by only one pair of left and right pedals (or levers).

In a vehicle provided with a control system of the instant type, heretofore, there have been provided one steering pedal (or lever) on each of the right and left sides, i.e., a total of two steering pedals (or levers). When either of the left and right pedals is independently depressed by itself, the steering clutch on that side is disengaged or released, and when that pedal is depressed further, the steering brake on that side is applied to cause the vehicle to turn toward that side.

Accordingly, when both the left and right pedals are depressed simultaneously, the left and right brakes are ultimately applied. However, since the clutches are disengaged prior to the effective application of the brakes, the clutches remain briefly in their disengaged state, and the driving wheels or sprockets are placed in their freely rotatable states. Consequently, when the vehicle is to be braked on an inclined ground surface, the vehicle begins to coast freely downhill for an instant until the brakes become effective. This result is extremely dangerous.

Furthermore, even when the brakes become effective, the difference in the alacrity and speed with which the left and right pedals are depressed and the difference in the force with which they are depressed immediately become the difference in the start of braking action and the difference in braking force of the left and right brakes, which differences give rise to unexpected swerving of the vehicle to the left or right, thereby causing further danger.

Accordingly, in order to reduce the above described dangerous tendencies, a control system wherein a third pedal exclusively for braking which directly actuates the brakes is alined in a row with the above mentioned two pedals for steering has been proposed. Thus, in this system a total of three pedals are provided for steering and braking. This arrangement, however, requires a complicated mechanism and, furthermore, makes the control operation troublesome and confusing, thereby introducing, moreover, the danger of erroneous depressing of the pedals.

SUMMARY OF THE INVENTION

It is an object of the present invention to overcome and eliminate the above described difficulties and dangers. More specifically, an object of the invention is to provide a control system whereby steering and braking of a vehicle having steering clutches and brakes can be accomplished entirely by only one pair of left and right pedals in a safe and positive manner for all conditions of driving.

Another object of the invention is to provide a control system having left and right pedals which can be depressed simultaneously with one foot in a safe manner without error.

A further object of the invention is to provide, in a control system of the above stated character, protective structures on the reverse sides of the pedal tread plates thereby to prevent a foot depressing and releasing one of the pedals from being caught by a part of the other pedal.

According to the present invention, briefly summarized, there is provided a control system of the above stated character which is characterized by the combination of left and right pedals for actuating the steering clutches and brakes of the vehicle, control means coupled between the pedals and clutches and operating upon depression of a pedal on one side to release the clutch on that side, and over-stroke means in the control means operating upon further depression of that pedal to cause application of the brake on that side after the clutch has been thus released.

The above mentioned control means operates; (1) upon subsequent depression of the pedal on the other side after the above mentioned application of the clutch on the first side to cause both clutches promptly to become and remain engaged as braking action is applied; (2) when both pedals are in depressed state to cause application of braking action with the clutches in engaged state; and (3) in cooperation with the over-stroke means, upon simultaneous depression of both pedals, to cause application of braking action with the clutches in engaged state.

BRIEF DESCRIPTION OF THE DRAWINGS

The nature, principle, details, and utility of the invention will be more clearly apparent from the following detailed description with respect to preferred embodiments of the invention when read in conjunction with the accompanying drawings, in which like parts are designated by like reference numerals.

In the drawings:

FIG. 1 is a perspective view, with parts cut away and certain vehicle parts indicated in outline by chain lines, showing the general organization of the essential parts of an example of the control system according to the invention as viewed from a point to the rear, to the left, and slightly above the operator's seat;

FIG. 2 is a side elevational view, in longitudinal section, showing the details of the internal construction of a spring mechanism for over-stroke operation in the system shown in FIG. 1;

FIGS. 6(a), 6(b), and 7 are fragmentary perspective views respectively showing examples of pedal tread plates and relative dispositions thereof.

DETAILED DESCRIPTION OF THE INVENTION

General description

Figure 3:
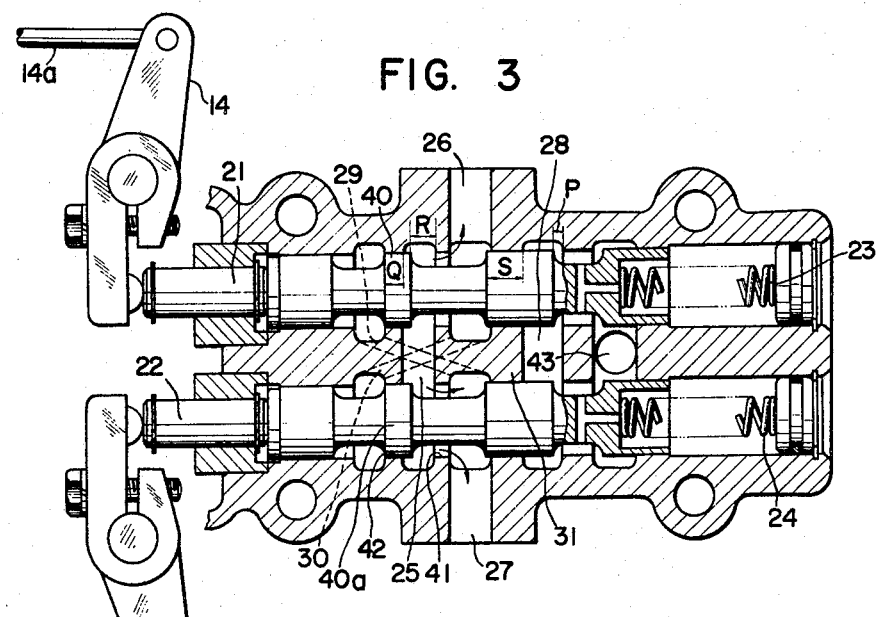
FIGS. 3, 4, and 5 are plan views, partly in horizontal section, showing an example of a hydraulic control valve for use in the system and respectively indicating different states of operation.

Our control system may be used with conventional steering clutches and brakes such as those disclosed in U.S. Patents 3,068,976 and 3,080,026.

Referring to FIG. 1, the example of the control system of the invention illustrated therein is installed in a vehicle of the aforementioned class between the operator's cab or cockpit, indicated by a floor F and seat ST, and the brake and clutch mechanisms disposed to the rear of the cab.

The control system is controllably actuated by the depression of right and left pedals 1 and 2 disposed in side-by-side positions above the floor F for depression by the feet of an operator seated on the seat ST. The pedals 1 and 2 are fixed to the upper ends of respective levers fixed at their lower ends to respective coaxial torque shafts 1a and 2a, which are rotatably supported in a transverse and horizontal position below the floor F.

Driving levers are fixed to the torque shafts 1a and 2a and pin-connected at their distal ends to the front ends of brake rods 3 and 4 and clutch rods 11 and 12, respectively. The rear ends of the brake rods 3 and 4 are pin-connected respectively to the ends of brake crank levers 7 and 8 for actuating right and left brake devices 9 and 10. The brake rods 3 and 4 are provided with return springs 5 and 6 as shown. The rear parts of the clutch rods 11 and 12 are connected by way of spring mechanisms 13, 13 to the ends of clutch crank levers 14 and 15 of a hydraulic control valve device 16.

When either of the pedals, for example, right pedal 1 is depressed, the right brake rod 3 and right clutch rod 11 are pulled forward together, and, consequently, brake crank lever 7 and clutch crank lever 14 are also moved forward together. First, the right clutch (not shown) is thereby released, and then the right brake is applied with the lever 14 being held in its state at the time by the action of the spring device 13 described more fully hereinafter. (The foregoing description is applicable also in the case when the left pedal 2 is depressed.) Thus, on one side of the vehicle, the clutch is first released, and then the brake is applied; that is, steering control is carried out.

However, when the vehicle is to be stopped abruptly or is descending an incline, the clutch is released prior to the application of the brake, whereby the braking action due to the engine drag is not available. This state is dangerous.

When both pedals 1 and 2 are simultaneously depressed, the right and left clutch rods 11 and 12 and brake rods 3 and 4 are all pulled forward. Then, when the right and left clutch crank levers 14 and 15 are thereby moved forward together, the hydraulic control valve device 16 operates (as described hereinafter) in a manner whereby both the right and left clutches are not released, and the brakes are applied while the braking action of the engine drag is being continuously applied. Moreover, since the right and left driving wheels or sprockets cannot rotate independently of each other, unexpected swerving of the vehicle does not occur, as in the case of known control systems, even when unbalanced right and left braking is caused by differences in the right and left pedal depressing speed and force.

Furthermore, when the brakes are to be applied during a turning maneuver caused by depressing one of the pedals, the other pedal is depressed to establish the state wherein both pedals are depressed thereby to place the clutches on both sides in their engaged state, and the brakes are thereby applied with the clutches thus engaged.

Spring mechanism 13

Referring to FIG. 2, each of the spring mechanisms 13 installed respectively at intermediate points of the clutch rods 11 and 12 comprises, essentially, a cylindrical casing 19 containing a compression spring 18 and a spring retainer 20 fixed to the front end of a rod 14a (or 15a) coaxially disposed relative to the casing 19 and passed to the rear slidably through the rear head of the casing, the spring 18 being interposed between the spring retainer 20 and the rear head of the casing 19.

The rear end of the rod 14a (or 15a) is connected to the clutch crank lever 14 (or 15). The rear end of the corresponding clutch rod 11 (or 12) is connected to the front end of the casing 19 and in a manner whereby the position of the casing relative to the clutch rod can be adjusted and set in the axial direction thereof.

It will be apparent, of course, that the installation of the spring mechanism 13 as described above and illustrated in FIGS. 1 and 2 may be reversed, in which case the rear end of the clutch rod is passed slidably through the casing and fixed to the spring retainer, and the front end of the rod 14a (or 15a) is adjustably connected to the rear end of the casing.

When the clutch rod 11 (or 12) is pulled forward by the depression of the corresponding pedal, the clutch crank lever 14 (or 15) is also moved forward (counterclockwise as viewed from the left side), the spring 18 having a sufficiently high spring constant so that it is not appreciably compressed during this initial action. When the clutch crank lever 14 (or 15) reaches the end of its stroke, however (at which time the corresponding clutch is released, as described hereinafter, in the case when only one side of the system is operated), the rod 14a (or 15a) cannot move further. Then, when the pedal is depressed further, the spring 18 within the casing 19 is compressed, and the crank rod moves forward through a certain distance. Accordingly, the corresponding brake rod also moves forward through a corresponding distance to apply the brake on its side.

It will be apparent that an equivalent linkage mechanism may be used in place of each of the above described spring mechanisms 13. Furthermore, the same operational effect of the spring mechanisms 13, 13 can be attained without the use thereof by suitably selecting the dimensions of the spools of the hydraulic control valve device described hereinbelow.

Hydraulic control valve device 16

Figure 4:
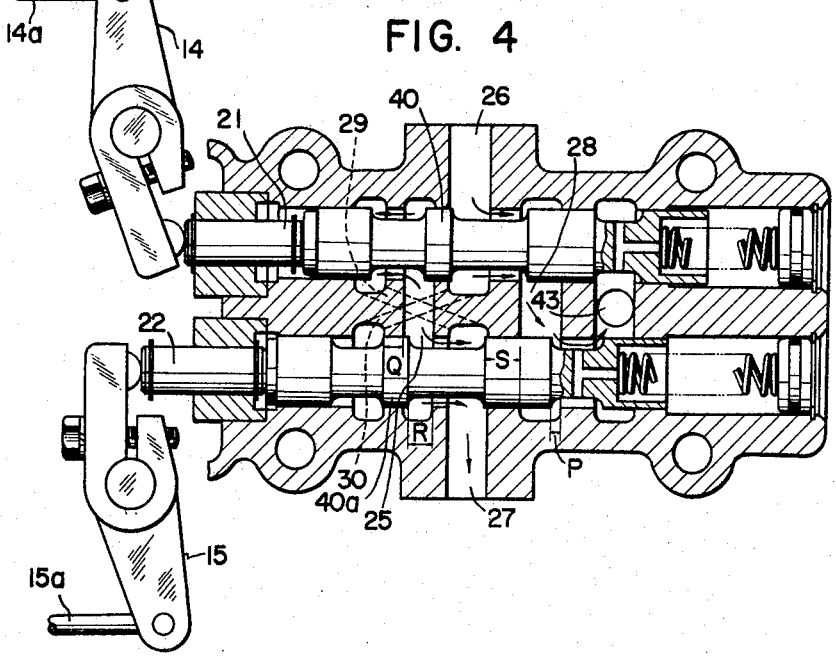
Figure 5:
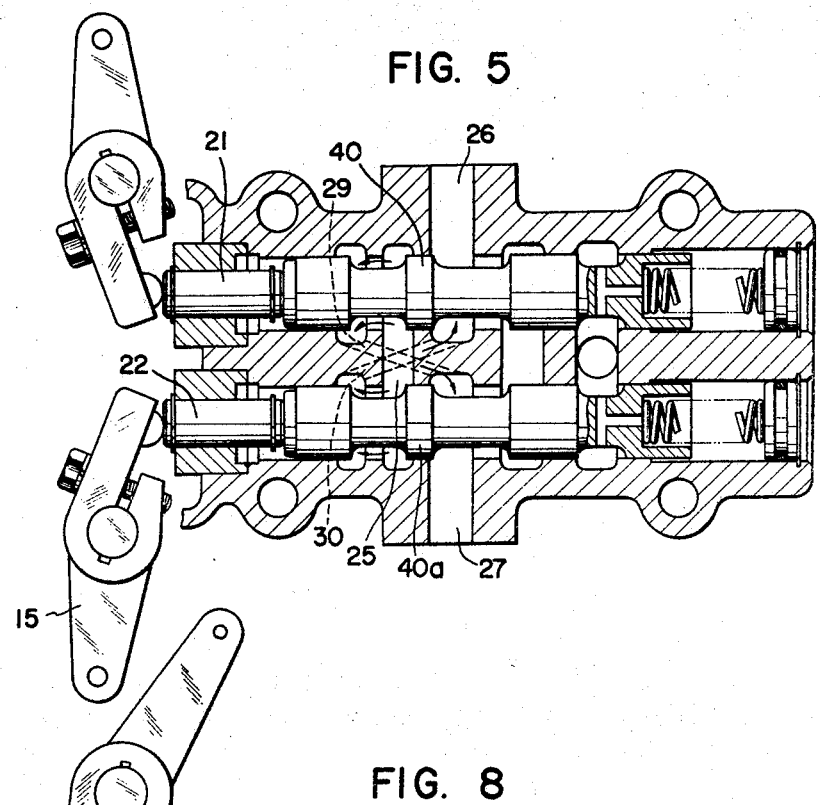

FIGS. 3, 4, and 5 show the essential organization of the hydraulic control valve device 16 shown in FIG. 1. As mentioned hereinbefore, when the pedal on one side is depressed, the clutch on that side is first released, and then the brake on that side is applied. When both pedals are depressed, the hydraulic control valve device 16 operates to cause release and engagement action of the clutches in a manner such that the brakes on both sides are applied without the clutches being released.

The control valve device 16 comprises, essentially, a casing and two valve spools 21 and 22 accommodated parallelly therewithin.

When hydraulic fluid introduced under pressure through a pump port 25 is permitted to flow as indicated by the arrows in FIG. 3, past the reduced diameter parts of the valve spools 21 and 22, directly to the clutch actuation ports 26 and 27, it causes the right and left clutches to be engaged.

When the right pedal 1 is depressed to pull clutch rod 11 forward, the clutch crank lever 14 pushes the spool 21 rearward (toward the right as viewed in FIG. 3) to the position shown in FIG. 4, at which a large-diameter valving part of the spool 21, i.e., a spool land 40, closes off the path to port 26. At the same time, the pump port 25 accommodating pressurized fluid is communicated with a bypass 29, and the hydraulic fluid within port 26 passes through a path 28 and enters a drain port 43, whereby the clutch (not shown) on one side (i.e., the right side in this instance) is released.

When, with the control valve 16 in this state, the left pedal 2 is depressed, the clutch crank lever 15 pushes the spool 22 rearward to a position at which a spool land 40a thereof closes off the pressurized fluid path to port 27 as indicated in FIG. 5 but, on the other hand, opens a path for the fluid through a bypass 30 to port 26, thereby causing the pressurized fluid to flow therethrough to engage the right clutch. Thus, the control system is in a state wherein both clutches are engaged.

In order to prevent disengagement of the clutches due to instantaneous closure of the hydraulic fluid paths during the depression stroke of the pedals, it is necessary to establish the dimension of the ports and spools of the control valve so that the distances indicated by S, R, Q, and P in FIGS. 3 and 4 will have an interrelationship expressed by $S>R>Q>P$.

When, with the dimensions thus established, the spool 22 is pushed to the right (rearward) from the state indicated in FIG. 4 to stop the vehicle during turning, the distance P diminishes to zero before the distance Q diminishes to zero; that is, the front edge of the spool land 40a separates toward the rear from the valve casing to communicate the pump port 25 with the bypass 30 after the gap P is closed. Accordingly, there is no possibility of the pressurized fluid in the port 25 temporarily passing by the part Q and through bypass 30 to flow out through the drain port 43. Therefore, there is no possibility of the clutches being disengaged for an instant.

Furthermore, during the operation of the control valve 16 from the state of FIG. 3 to the state of FIG. 5, the part Q is opened prior to the closing of the gap R. Therefore, there is no possibility of the flow of the pressurized fluid being temporarily closed off to cause the clutches to be disengaged for an instant. Moreover, during the operation from the state of FIG. 3 to the state of FIG. 4, the part P of spool 21 closes after the part R closes, wherefor there is no possibility of the hydraulic pressure on the side of port 27 escaping through part R to the drain port to cause the left clutch on the side of spool 22 to be disengaged for an instant.

In the case where the clutches are of the hydraulic actuation type or of the mechanical type with a hydraulic booster which is released upon introduction thereinto of pressurized fluid, the port 25 is connected to the drain circuit, and the port 43 is connected to the pump circuit of the hydraulic system.

As mentioned briefly hereinbefore, it is possible to connect the clutch rods 11 and 12 directly to the hydraulic control valve without the use of interposed spring mechanisms 12, 13 to obtain interlocking whereby the brakes are applied after the clutches have been released. This action can be obtained by increasing the lengths of the lands of the spools and the dimensions of the valve body cylinders in which the lands move in the hydraulic control valve 16 thereby to impart to the control, itself, a capacity to permit overstroking.

Figure 8:
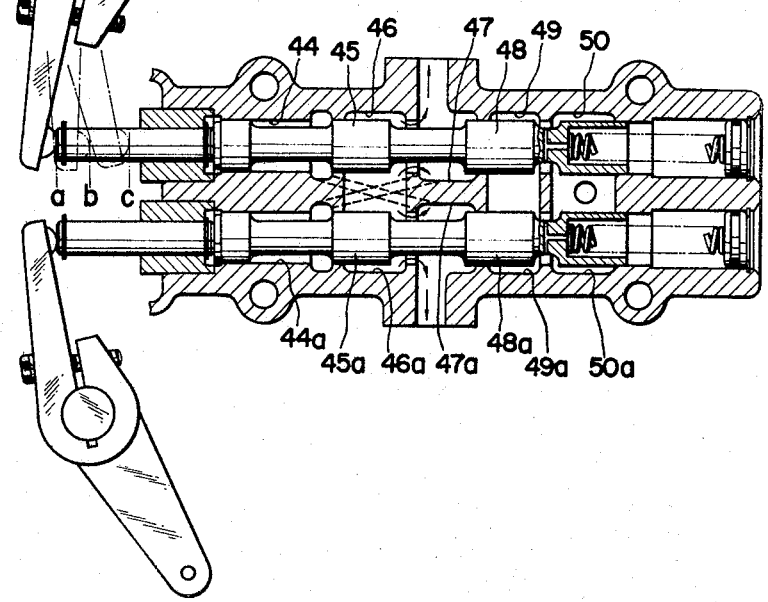
FIG. 8 is a plan view, partly in horizontal section, showing a hydraulic control valve adapted to be coupled directly to clutch rods.

More specifically, as indicated in FIG. 8, the dimensions in the axial direction of spool lands 45, 45a, 48 and 48a, land parts 44 and 44a of the valve casing cylinder parts, and port parts 46, 46a, 47, 47a, 49, 49a, 50 and 50a are all lengthened to a length for each spool equivalent to the addition thereto of the length of the operational range of the corresponding spring mechanism 13. In addition, the dimensions of the other related parts are changed to cause the spools to be moved by the clutch crank levers connected directly to the clutch rods to assume positions a, b, and c. As a result, the hydraulic control valve can be caused to undergo the same action as that of the control valve shown in FIG. 3 actuated through spring mechanisms 13, 13.

Pedal mechanism

While two (left and right) pedals 2 and 1 are used in the control system of the invention, the tread plates of the two pedals may be formed and combined, as illustrated by one example in FIG. 6(a), to have inner parts which are mutually interposed or interlapped yet permit independent movements of the two pedals. In the example illustrated in FIG. 6(a), the tread plate of the right pedal 1 has a tongue part 52 freely interposed in a groove between two fork prong parts 51 of the tread plate of the left pedal 2. By this arrangement, when it is necessary to depress both pedals simultaneously, both pedals can be so depressed with one foot on the interlapped parts 51 and 52, whereby control action can be effected in a positive and simple manner without the risk of erroneous operation.

The present invention provides a further refinement comprising protective guide plates provided on the reverse sides of the two pedal tread plates at respective parts thereof which move relatively in close proximity to each other. Examples of these guide plates are illustrated by guide plates 53 and 54 in FIG. 6(b) and guide plates 55 and 56 in FIG. 7. These guide plates prevent a foot which has been depressing its pedal from being caught by the inner end of the tread plate of the other pedal when that foot is lifted to return its pedal to the undepressed position. Accordingly, safe pedal control operation is afforded.

The control system of the above described organization according to the invention affords the following advantageous features through the operation of the hydraulic control valve and spring mechanisms intercoupled with the left and right pedals or the special design of the control valve as illustrated in FIG. 8 to replace the function of the spring mechanisms.

When a pedal on either of the left and right sides is depressed, the clutch on that side is first released, and then the brake on the same side is applied to facilitate turning of the vehicle toward that side. When the vehicle is to be braked during turning toward one side, the mere procedure of depressing the pedal of the opposite side causes both of the left and right clutches to be engaged, whereby safe and positive braking is applied without any unexpected occurrence such as swerving in an unexpected direction.

Then, when both pedals are depressed further, the brakes are applied with the clutches in the engaged state, whereby not only the braking action of the brake shoes or disks but also the braking action (so-called "engine braking") due to the engine drag are combined to produce highly effective braking. Furthermore, since the left and right clutches are in the engaged state, the left and right driving wheels or sprockets rotate in unison as a unitary member, whereby unexpected swerving and other undesirable occurrences do not arise.

That is, irrespective of whether the vehicle is turning or whether it is moving in a straight path, when the pedals are depressed to cause braking, braking action is always produced with the left and right clutches in the engaged state. Therefore, safety is assured in descending inclines and in turning.

Moreover, both pedals can be depressed with one foot, and there is no danger of serious accidents due to errors in selecting brake and clutch pedals as was possible in the case of known control means.

We claim:

1. In a control system for a dirigible vehicle of the type having left and right steering pedals, left and right steering clutches and brakes controlled by the respective pedals, and control means operatively interconnecting the pedals to the respective clutches and brakes, the improvement comprising, in combination, a hydraulic control valve constituting said control means and controlling the supply of hydraulic fluid under pressure for effecting operating of the clutches; said control valve including a casing formed with a pair of substantially parallel bores each slidably receiving a respective spool operated by a respective pedal through a respective connecting means, a fluid inlet port and a fluid return port, each communicating with both bores, a pair of clutch operating ports each communicating with a respective bore, and a pair of by-pass passages each connecting a respective bore to the clutch operating port communicating with the other bore; said spools having lands controlling flow through the respective bores; and spring means acting in opposition to said pedals and biasing said spools to a first position in which each spool establishes communication between its associated clutch operating port and the same one of said inlet and return ports, while blocking communication between its associated clutch operating port and the same other of said return and inlet ports; each spool being operable by its associated pedal and connecting means, during a steering operation and against the bias of said spring means to a second position connecting its associated clutch operating port to the other of said return and inlet ports and connecting its associated by-pass passage to said one of said inlet and return ports, while its associated pedal operates the brake controlled thereby.

2. In a control system for a dirigible vehicle, the improvement claimed in claim 1, in which said casing is formed with a passage interconnecting both bores; each spool, in said first position, blocking communication between said passage and its associated clutch operating bore and establishing communication between said passage and the other of said return and inlet ports; each spool, in said second position, establishing communication between its associated clutch operating port and said passage, and blocking communication, through its associated bore, between said passage and the other of said return and inlet ports; whereby, when a spool is in said second position, its associated clutch operating port is connected to the other of said return and inlet ports through said passage and the bore associated with the other spool.

3. In a control system for dirigible vehicle, the improvement claimed in claim 2, in which, responsive to concurrent depression of both steering pedals, both spools are moved to said second position establishing communication between both clutch operating ports and said one of said inlet and return ports and blocking communication between both clutch operating ports and the other of said return and inlet ports; whereby the clutches are maintained operating during a braking operation of the vehicle.

4. In a control system for a dirigible vehicle, the improvement claimed in claim 3, in which said control means includes over-stroke means providing for continued depression of said pedals with the associated spools remaining in said second position.

5. In a control system for a dirigible vehicle, the improvement claimed in claim 4, in which each connection means comprises a pair of substantially rectilinearly aligned rod elements; each over-control means comprising a cylindrical casing connected at one end to one rod element of the respective connection means, and having the other rod element of the respective connecting means extending thereinto through the other end thereof, a spring seat within said casing connected to the other rod element of the respective connection means, and a compression spring embracing the other rod element of the respective connection means and engaged between said spring seat and said other end of said cylindrical casing.

6. In a control system for a dirigible vehicle, the improvement claimed in claim 4, in which said over-stroke means comprises extensions of lands of each spool to maintain the connections in said second position during further depression of said pedals.

7. In a control system for a dirigible vehicle, the improvement claimed in claim 2, in which each spool, in its first position, establishes communication between its associated clutch operating port and said inlet port while blocking communication between its associated clutch operating port and said return port.

8. In a control system for a dirigible vehicle, the improvement claimed in claim 2, in which each spool, in said first position, establishes communication between its associated clutch operating port and said return port while blocking communication between its associated clutch operating port and sad inlet port.

9. In a control system for a dirigible vehicle, the improvement claimed in claim 2, in which said clutch pedals are laterally directly adjacent each other; each clutch pedal, at its end adjacent the other clutch pedal, substantially overlapping the other clutch pedal in an interfitting and non-interfering manner.

10. In a control system for a dirigible vehicle, the improvement claimed in claim 2, in which said pedals have their laterally facing inner ends immediately adjacent each other; and respective protective guide structures on the under surface of each pedal adjacent such laterally adjacent end thereof and preventing an operator's foot, depressing and releasing a pedal, from being caught by a part of the other pedal.

11. In a control system for a dirigible vehicle, the improvement claimed in claim 10, in which said clutch pedals are laterally directly adjacent each other; each clutch pedal, at its end adjacent the other clutch pedal, substantially overlapping the other clutch pedal in an interfitting and non-interfering manner.

References Cited

UNITED STATES PATENTS

| | | | |
|---|---|---|---|
| 2,393,768 | 1/1946 | Graham | 192—13 |
| 3,068,976 | 12/1962 | Kelley | 192—13 |
| 3,181,388 | 5/1965 | Riddy | 74—478.5 X |
| 3,262,525 | 7/1966 | Ehlke e al. | 74—478.5 X |

BENJAMIN W. WYCHE III, Primary Examiner

U.S. Cl. X.R.

74—478.5; 137—625.69; 180—6.2; 192—87.13